Jan. 18, 1966   A. B. STILES   3,230,034
METHOD OF TREATING EXHAUST GASES OF INTERNAL
COMBUSTION ENGINES
Filed Sept. 29, 1960

INVENTOR
ALVIN B. STILES

BY Albert B. Griggs.
ATTORNEY

United States Patent Office

3,230,034
Patented Jan. 18, 1966

3,230,034
METHOD OF TREATING EXHAUST GASES OF INTERNAL COMBUSTION ENGINES
Alvin B. Stiles, Charleston, W. Va., assignor to E. I. du Pont de Nemours and Company, Wilmington, Del., a corporation of Delaware
Filed Sept. 29, 1960, Ser. No. 59,376
2 Claims. (Cl. 23—2)

This invention relates to the improvement of catalysts and is more particularly directed to catalyst aggregates of crystallites of a catalytic material which are kept apart by crystallites of a refractory which melts above 1000° C., the aggregates thus constituted thereafter having crystallites of a refractory which melts above 1000° C. added thereto to keep the former two groups of crystallites apart and thus to form a catalytic aggregate which is stabilized against crystallite growth and inactivation at high temperatures.

Figure 1:
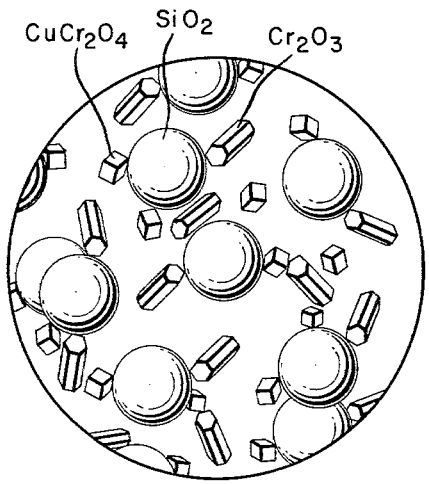
Figure 2:
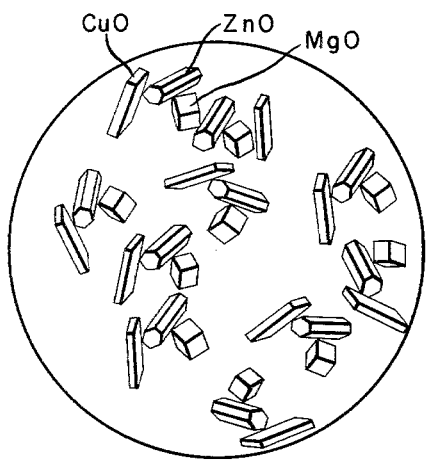

The invention can be better understood by reference to the drawings in which:

FIGURE 1 is an artist's representation of a catalytic aggregate of the invention showing the association of crystallites of copper chromite with silica and chromium oxide, and FIGURE 2 is a similar showing of a modified product in which crystallites of copper oxide are kept apart by zinc oxide and both are stabilized by a further addition of magnesium oxide.

The invention can be described generally by reference, for example, to FIGURE 1. A catalytic material, copper chromite, is formed in conventional manner as crystallites of small size. Ordinarily these crystallites grow rapidly when the catalyst is put into use under conditions such that the catalyst is heated. According to the present invention a refractory material which melts above 1000° C. is formed in conventional manner as crystallites in the same size range as the copper chromite and intimately mixed with it. These are then heated to drive off any volatile components and the resulting aggregate is treated with still another refractory, chromium oxide, in the form of small crystallites. The drawing shows an association of such crystallites and it will be seen that the crystallites of refractories keep each other apart and also keep the copper chromite crystallites apart so that crystal growth is hindered.

In general it can be said that any catalytic material known in the art can be benefited according to the present invention providing only that the catalytic material is in, or can be put in, substantially colloidal form. That is, the ultimate particles of a catalyst should preferably be no greater than about 1500 angstroms or more preferably no greater than 100 angstroms. Such particles are most preferably in the form of unitary crystals and if in the dry form are pulverulent to the ultimate particles. The ultimate particles, which are recognizable as crystallites by X-ray techniques, should preferably be in a size range under 500 angstroms and still more preferably around 50 angstroms or below. Ideally the form is as colloidal suspensions in which the particles are all in the ranges mentioned, though dispersions and suspensions can be used in which there is some aggregation of particles. This will become more apparent hereinafter.

The determination of crystallite size and character can be made by conventional X-ray analytical techniques. A suitable method is shown in X-Ray Diffraction Procedures by H. P. Klug and L. E. Alexander, published by John Wiley & Sons, New York, 1954 edition.

When reference is made to crystallite size it will be understood that this refers to the largest dimension of the crystallite as determined by X-ray or electron microscope techniques. It is to be noted that when reference is made to the crystallite size, the size measured is ordinarily that of a catalyst as freshly prepared after calcination or final drying. After use at high temperatures for extended periods of exposure and at moderate temperatures there will be some growth of crystallite size.

It is to be noted that X-ray diffraction and electron diffraction are not too informative about particle size if a particular catalyst contains large crystallites as well as small crystallites. The large crystallites obscure the presence of the small ones which may nevertheless be present in amount sufficient to make the catalyst satisfactorily effective—say, even as low as 5 to 10%. In this event crystallite size must be determined by another method such as the electron micrograph. Thus there is no objection to having large crystallites present in a catalytic aggregate of the invention providing only that there are a sufficient number of small crystallites preferably in the size ranges herein described so that the catalyst is suitably active and so that the interspersants are effective. In other words crystallites of the catalysts and interspersants which are present in sizes well outside of the preferred ranges can be regarded as diluents which are largely inert and if not present in too large amount are not objectionable.

The preparation of the novel catalytic aggregates of the present invention will ordinarily begin by forming a dispersion of the catalytic material in a liquid medium such as water, acetone, alcohols such as methanol or ethanol, cyclohexane, benzene, or any other inert liquid. Water is preferred because it is cheap and non-inflammable.

The catalytic materials can be formed in situ as by chemical decomposition. Thus copper chromite can be precipitated in the desired form by adding ammonium hydroxide to an aqueous soluton of chromic acid and copper nitrate. This gives a precipitate of basic copper chromate which on heating decomposes to copper chromite.

Again, there can be made colloidal dispersions of silica in water containing chloroplatinic acid and the chloroplatinic acid can be reduced to platinum with such well-known reducing agents as formaldehyde or methanol. This gives metallic platinum colloidally dispersed upon particles of silica. In this instance silica serves as an interspersant.

In general, the formation of colloidal suspensions or dispersions of catalytically active materials is thoroughly understood in the art and extended descriptions of these techniques are unnecessary. In many instances, as is well understood, the precipitate is a hydroxide or carbonate or an oxalate or another product which is thermally decomposable to give the catalytically active material in which event heating of the product, preferably in the presence of the interspersant, will produce the catalytically active material suitably distended by the interspersant.

Alternatively, catalytic aggregates of the invention can conveniently be made by heat fusion of finely divided, low melting salts which readily decompose or interact to form the catalytic materials wanted in finely divided form. Thus finely divided mixtures can be made containing chromic anhydride, copper or nickel nitrates, formates, or acetates. These will interact and reduce the chromic acid. Manganese carbonate, manganese nitrate, and other decomposable compounds can be included in mixtures to be fused to supply manganese oxide. Similarly these can be reacted with molybdic oxide. The compounds to react or to select as heat decomposable materials will be readily apparent and will be illustrated hereinafter.

Typical catalytic materials which, as crystallites of the sizes already described, are suitable for including in catalytic aggregates of the invention are:

| Compound | Group | Crystal system |
|---|---|---|
| 1. copper chromite | gamma | cubic. |
| 2. cadmium chromite | do | Do. |
| 3. calcium chromate | beta | monoclinic. |
| 4. zinc chromite | gamma | cubic. |
| 5. mercuric chromite | do | Do. |
| 6. barium chromate | beta | rhombohedral. |
| 7. stannic chromate | gamma | cubic. |
| 8. plumbic chromate | do | monoclinic. |
| 9. bismuth chromite | do | cubic. |
| 10. thallium chromite | do | Do. |
| 11. ferrous chromite | do | Do. |
| 12. cobaltic chromite | do | Do. |
| 13. nickelic chromite | do | Do. |
| 14. copper manganite | do | Do. |
| 15. cadmium manganite | do | Do. |
| 16. calcium manganite | beta | Do. |
| 17. zinc manganite | gamma | Do. |
| 18. barium manganite | beta | Do. |
| 19. stannic manganite | gamma | Do. |
| 20. ferrous manganite | do | Do. |
| 21. cobaltous manganite | do | Do. |
| 22. nickelous manganite | do | Do. |
| 23. cadmium molybdate | do | tetragonal. |
| 24. calcium molybdate | do | Do. |
| 25. barium molybdate | do | Do. |
| 26. plumbous molybdate | do | Do. |
| 27. cadmium tungstate | do | rhombohedral. |
| 28. calcium tungstate | do | tetrahedral. |
| 29. zinc tungstate | do | monoclinic. |
| 30. barium tungstate | do | tetragonal. |
| 31. plumbous tungstate | do | Do. |
| 32. bismuth tungstate | do | Do. |
| 33. manganous tungstate | do | monoclinic. |
| 34. ferrous tungstate | do | Do. |
| 35. cobaltous tungstate | do | Do. |
| 36. nickelous tungstate | do | Do. |
| 37. cupric tungstate | do | cubic. |
| 38. chromium vanadate | do | orthorhombic. |
| 39. bismuth vanadate | do | Do. |
| 40. cadmium cerate | do | cubic. |
| 41. calcium cerate | beta | monoclinic. |
| 42. barium cerate | do | cubic or monoclinic. |
| 43. copper cerate | gamma | cubic. |
| 44. plumbous cerate | do | cubic or monoclinic. |
| 45. cadmium stannate | do | monoclinic. |
| 46. calcium stannate | beta | tetragonal. |
| 47. zinc stannate | gamma | cubic. |
| 48. barium stannate | beta | Do. |
| 49. plumbous stannate | gamma | tetragonal. |
| 50. cobaltous stannate | do | cubic. |
| 51. cupric ferrite | do | hexagonal. |
| 52. cadmium ferrite | do | cubic. |
| 53. calcium ferrite | beta | orthorhombic. |
| 54. zinc ferrite | gamma | cubic. |
| 55. chromium ferrite | do | hexagonal. |
| 56. barium ferrite | beta | Do. |
| 57. plumbous ferrite | gamma | Do. |
| 58. manganous ferrite | do | cubic. |
| 59. ferrous ferrite | do | Do. |
| 60. cobaltous ferrite | do | Do. |
| 61. nickelous ferrite | do | Do. |
| 62. cuprous oxide | beta | Do. |
| 63. silver oxide | do | Do. |
| 64. cadmium oxide | do | Do. |
| 65. calcium oxide | do | Do. |
| 66. zinc oxide | do | hexagonal. |
| 67. mercuric oxide | do | orthorhombic. |
| 68. barium oxide | do | cubic. |
| 69. stannic oxide | do | tetragonal. |
| 70. plumbic oxide | gamma | cubic. |
| 71. bismuth oxide | do | Do. |
| 72. chromic oxide | alpha | hexagonal or cubic. |
| 73. molybdic oxide | do | monoclinic. |
| 74. thallium oxide | gamma | cubic. |
| 75. tungstic oxide | alpha | tetragonal. |
| 76. manganese oxide | gamma | cubic. |
| 77. manganese oxide, MnO | do | Do. |
| 78. manganese oxide, $Mn_2O_3$ | do | Do. |
| 79. manganese oxide, $MnO_2$ | alpha | rhombic. |
| 80. ferric oxide | gamma | cubic. |
| 81. cobaltic oxide | do | Do. |
| 82. nickelic oxide | do | Do. |
| 83. palladium oxide | do | tetragonal. |
| 84. platinum metal | do | cubic. |
| 85. nickel metal | do | Do. |
| 86. copper metal | do | Do. |
| 87. palladium metal | do | Do. |
| 88. ruthinium metal | do | hexagonal. |
| 89. mercury metal | do | cubic. |

Heteropoly acids as disclosed in Turkevitch U.S. Patent 2,886,515 can be used as follows:

[X = 1–70]

| Compound | Group | Crystal system |
|---|---|---|
| 90. $H_9Al(MoO_4)_6 \cdot XH_2O$ | alpha | rhombohedral. |
| 91. $H_9Cr(MoO_4)_6 \cdot XH_2O$ | do | Do. |
| 92. $H_9Fe(MoO_4)_6 \cdot XH_2O$ | do | Do. |
| 93. $H_9Co(MoO_4)_6 \cdot XH_2O$ | do | Do. |
| 94. $H_9Mn(MoO_4)_6 \cdot XH_2O$ | do | Do. |
| 95. $H_9Rh(MoO_4)_6 \cdot XH_2O$ | do | Do. |
| 96. $TiO_2 \cdot 12MoO_3 \cdot 22H_2O$ | do | Do. |
| 97. $GeO_2 \cdot 12MoO_3 \cdot 32H_2O$ | do | Do. |
| 98. $V_2O_5 \cdot 8MoO_3 \cdot 5H_2O$ | do | Do. |
| 99. $(NH_4)_5H_3[H_2MoS_4]_4VS_3 \cdot 10H_2O$ | do | Do. |
| 100. $(NH_4)_4H_6[Ni(MoO_4)_6] \cdot 5H_2O$ | do | Do. |
| 101. $(NH_4)_4H_6[Cu(MoO_4)_6] \cdot 5H_2O$ | do | Do. |
| 102. $(NH_4)_4H_6[Rh(MoO_4)_6] \cdot 7H_2O$ | do | Do. |
| 103. $(NH_4)_5H_2[P(V_2O_5)_6] \cdot 21H_2O$ | do | Do. |
| 104. $H_4[SiMo_{12}O_{40}] \cdot 10H_2O$ | do | Do. |
| 105. $SiO_2 \cdot 12MoO_3 \cdot 32H_2O$ | do | Do. |
| 106. $P_2O_5 \cdot 24MoO_3 \cdot 63H_2O$ | do | Do. |
| 107. $B_2O_3 \cdot 24WO_3 \cdot 63H_2O$ | do | Do. |
| 108. $I_2O_7 \cdot 12WO_3 \cdot 11H_2O$ | do | Do. |

NOTE.—It is noted that the heteropoly acids are amorphous until they are heated and at this time there is crystal formation because of the oxides of tungsten, molybdenum, or vanadium present in them. These crystallize in the system as shown above.

The crystal system indicated above for each of the products shown is the customary and principal form of the compound and in some circumstances various of the materials shown can exist in other crystalline forms or in mixtures of the above with other crystalline forms. The particular crystal form can readily be observed with respect to any particular material which one wishes to use.

The designation alpha, beta, and gamma is applied to catalytic materials upon a largely empirical basis. The ones designated alpha have an acidic character with respect to most refractory interspersants. The beta catalytic materials are of a basic nature with respect to the refractories. The gamma catalysts are not strongly acidic or basic. It is noted of the heteropoly acids that while they are essentially neutral they become acidic upon heating. They are therefore treated above as alpha materials.

It is probably more accurate to say that the beta catalysts are donor compounds with relation to covalent bonding while the alpha are acceptors. The gamma catalysts are not strongly active either as acceptors or donors but under some circumstances can be either acceptors or donors.

As described generally above, with reference to FIGURE 1, the catalytic material or materials selected are formed into aggregates in which the crystallites of the catalytic material are kept apart by a refractory material which melts above 1000° C. and which is here often called an interspersant.

A colloidal dispersion or a suspension of an active catalytic material as described is placed in a liquid medium, preferably water, and to this is added the interspersant. The interspersant is similar in colloidal dispersion or suspension or can be formed in situ by chemical reaction between suitable reactants.

The interspersants, the chemical nature of which will be described further hereinafter, are of a size comparable to the catalytic material. Thus the crystallite size should preferably not be notably larger than 1500 angstroms and it is more preferred that the size be no greater than 500 and, still better, no greater than in the range of about 50 angstroms.

The interspersant is preferably heteromorphic, that is it is of a different crystal form from the catalytic material. By having an interspersant which is heteromorphic with respect to the catalytic material, close packing of crystallites is minimized and the crystallites of the catalytic material are better kept apart than by an interspersant which is in the same crystal form. The interspersant can be of the same form, particularly if of a somewhat larger or smaller crystallite size than the catalyst but this is not preferred and catalysts so constituted are less stable than those in which the catalytic and interspersant crystallites are heteromorphic.

Suitable interspersants are listed hereafter and the crystal system is given to aid selection of heteromorphic materials with respect to the catalyst selected. The groups are also given. These are designated alpha for materials of a basic character with respect to catalysts. The interspersants designated beta are of an acidic character and those designated delta are not strongly acidic or basic. As with the catalysts it is perhaps more accurate to say that the alpha interspersants are donor compounds with relation to covalent bonding while the beta are acceptors. The delta interspersants are not strongly active either as acceptors or donors but under some circumstances can be either acceptors or donors. As will become apparent hereinafter it is desired that the interspersant selected for use with a particular catalyst not only be heteromorphic but it should not be of the same group as the catalyst. Thus with an alpha catalyst a beta or delta interspersant can be used. Similarly with a beta catalyst an alpha or a delta interspersant can be used. With a gamma catalyst an alpha, beta or delta interspersant can be used. In aggregates containing several catalysts and several interspersants to the extent possible the catalysts should all be either alpha, beta or gamma but if one is gamma another can be alpha or beta. Similarly the interspersants should all be of the same group as each other or if one is delta another can be alpha or beta, depending on the catalyst.

The catalytically active material dispersed or suspended in an aqueous or other liquid is appropriately mixed with the interspersant selected as herein described. The interspersant similarly can be added to the system as by adding a silica sol, a titania or calcium oxide sol, or an alumina sol, or other such colloidal suspension directly to the system. Alternatively they can be formed in situ in conventional fashion as by using or forming water-soluble salts which are heat-decomposable to the respective oxides. Similarly, interspersants such as insoluble compounds like barium and calcium silicates, titanates, and the like can be formed from the appropriate soluble salts as will be hereinafter illustrated and these can be formed separately or in the presence of the catalytic material. If formed separately the sols or dispersions of the respective materials can be brought together prior to drying.

Generally the interspersant can be any refractory material which is in or can be put in the form of crystallites in the size ranges described. Preferred interspersants are as follows:

*Interspersants*

| Compound | Group | Crystal system |
| --- | --- | --- |
| 1. beryllium oxide | alpha | hexagonal. |
| 2. magnesium oxide | do | cubic. |
| 3. calcium oxide | do | Do. |
| 4. zinc oxide | delta | hexagonal. |
| 5. cadmium oxide | alpha | cubic. |
| 6. barium oxide | do | cubic or hexagonal. |
| 7. strontium oxide | do | cubic. |
| 8. aluminum oxide | delta | hexagonal or trigonal. |
| 9. lanthanum oxide | alpha | hexagonal. |
| 10. silicon oxide | beta | hexagonal, tetragonal, monoclinic or cubic. |
| 11. titanium dioxide | do | rhombic or tetragonal. |
| 12. zirconium oxide | do | tetragonal. |
| 13. hafnium oxide | do | cubic. |
| 14. chromic oxide | do | cubic or hexagonal. |
| 15. manganese oxide | delta | cubic. |
| 16. barium titanate | do | tetragonal. |
| 17. zirconium silicate | do | Do. |
| 18. magnesium aluminate | do | cubic. |
| 19. cerium oxide | alpha | Do. |
| 20. calcium titanate | delta | Do. |
| 21. aluminum chromite | do | Do. |
| 22. barium silicate | do | Do. |
| 23. magnesium silicate | do | Do. |
| 24. calcium silicate | do | Do. |
| 25. strontium silicate | do | monoclinic. |
| 26. magnesium titanate | do | hexagonal. |
| 27. strontium titanate | do | cubic. |
| 28. calcium titanate | do | Do. |
| 29. barium zirconate | do | Do. |
| 30. magnesium zirconate | do | Do. |

*Interspersants*—Continued

| Compound | Group | Crystal system |
| --- | --- | --- |
| 31. calcium zirconate | delta | cubic. |
| 32. strontium zirconate | do | Do. |
| 33. barium cerate | do | Do. |
| 34. magnesium cerate | do | Do. |
| 35. calcium cerate | do | monoclinic. |

The precipitation of catalytic material and of interspersant should ordinarily be effected from a comparatively dilute solution. Usually there should be used about one molar concentration, with respect to the water, of the catalytic precursor material and of the interspersant. If much higher concentrations are used there is a tendency to favor the production of larger crystallites. It is also worthwhile to use moderately dilute solutions because occlusion of impurities is minimized. More dilute solutions can be used but of course they become more voluminous and troublesome to handle.

It will be understood that while the crystallites are formed in the particle size desired they precipitate as aggregates and agglomerates of loosely associated crystallites which can be separated from water as by filtration, centrifugation, or decantation. Instead of using the oxides shown in the above list, one can use the hydroxide as of aluminum, calcium, barium. One of the preferred interspersants is aluminum hydroxide which will be present as the oxide in the final product.

It will be understood that some of the interspersants such as manganese oxide and chromia will often have a small amount of catalytic activity of their own though this is not the primary reason for including them in the aggregates of the invention.

It will be understood that while the interspersants will normally be in the form of the oxide in the final catalyst aggregate after calcination, the crystallites can be introduced in the form of heat-decomposable salts as has already been noted generally above. These can be formed in situ in the presence of the catalytic crystallites and in the presence of any additional catalytic materials or carriers. Such heat-decomposable products can be used as aluminum nitrate; thorium nitrate; cerium nitrate; chromium nitrate; calcium hydroxide, nitrate and acetate; barium hydroxide and nitrate; manganese nitrate; zinc nitrate; and strontium nitrate.

Typical of the above interspersants which can readily be introduced in the form of sols or dispersions are the following:

Magnesium oxide and hydroxide
Titanium oxide, sol and gel
Aluminum alcoholates
Zircon powder
Aluminum hydroxide gel
Zirconia gel
Cerium oxide
Silica sol
Zinc oxide and hydroxide
Strontium oxide and hydroxide The production of interspersants in suitable colloidal or dispersed form whether formed separately or in situ requires no extended discussion because the preparation of such colloidal dispersions is well understood. Examples will be given below of typical methods of production.

After the interspersant has been added to the catalytically active material as described, the catalyst distended with the interspersant is then dried and heated further to remove water and to decompose the catalyst, if need be, and the interspersant, if need be.

The calcination temperature should be below that at which sintering occurs and it should be sufficiently high to effect decomposition of the hydrates, carbonates, acetates, oxalates or other salts which it is planned to decompose in order to develop the catalytically active material or interspersant. Generally a temperature between 200 and 500° C. is appropriate and will effect decomposition of volatile components in the aggregate.

It should be observed that the inclusion of an interspersant is not to be confused with the mere inclusion of a support material or the precipitation of a catalyst upon a supporting material. As is illustrated in the drawings and as has been explained above, the interspersant is of comparable crystallite size to the catalytic material and is heteromorphic so that it serves as an intercrystallite distender rather than as a mere support.

The interspersant can be used in widely varying amounts from, for example, 0.1% up to, say, 95% based upon the total weight of solids in the final precipitate or mixture of the catalyst plus interspersant. The lower limit represents the minimum amount of interspersant which will ordinarily be effective to substantially retard crystallite growth of the catalytic material. Somewhat larger amounts than 0.1 will ordinarily be desired effectively to hinder crystallite growth so that ordinarily it will be desired to use somewhat larger amounts such as 2% or more by weight. Larger amounts of interspersant begin to serve only as a diluent and obviously should not become so great as to render the catalyst too low in activity because of lack of sufficient active catalytic material.

It is to be noted that even as more than one catalytic material can be included in an aggregate of the invention, so also there may be used two or more interspersants. The additional interspersant can be heteromorphic both to the catalytic material and the first interspersant for best results but can be of the same crystallite form as the first interspersant or even as the catalyst.

After catalyst aggregates are thus formed and even more after calcination the products prepared have a somewhat open structure. These are stabilized by the introduction into the structure of an inert which has no greater than the permissible particle size for such introduction. The material introduced at this point is a second interspersant and its function has already been explained in connection with the general description of the invention with reference to FIGURE 1. The second interspersant can be selected from the lists of interspersants given above and there is no point in repeating the tabulated lists and discussions of interspersants.

The second interspersant is preferably heteromorphic with respect both to the catalytic material and the interspersants already present in the catalyst aggregate. The second interspersant, however, can be of the same crystal pattern as either the catalyst or the interspersant or both. When we speak of a "second interspersant" it will be understood that this is with respect to the point of its introduction into the catalyst rather than the number of interspersants. As has been noted, two or more interspersants can be coprecipitated in the catalyst aggregate. The second interspersant can be one or more interspersants which are added to the catalyst aggregate after it has been calcined.

The second interspersant can be of any group, that is it can be alpha, beta, or gamma, though there is a preference that it be different from the catalyst.

The second interspersant, like the interspersant, can be formed by reaction in situ or it can be introduced into the catalyst aggregate as a sol or dispersion. The sols and dispersions already described and the methods herein mentioned for forming interspersants are applicable.

The crystallite size of the second interspersant is preferably about the same as the size of the interspersant and the catalytically active material as already described. Thus the ultimate crystallite size should not greatly exceed 1500 angstroms, is preferably less than 1000, and it is still more preferred that it be no greater than 500 angstroms. The most preferred products have second interspersants with a crystallite size of the order of about 50 angstroms.

The second interspersant can range in amount from 0.5% to 50% or so by weight of the combined weight of the catalyst aggregate including first interspersants.

While ordinarily it is preferable to add the second interspersant after a calcination it can instead be added to the catalyst aggregate after it has been precipitated. Thus it may be added to the filter cake of the catalyst aggregate.

A catalytic product of the invention thus can contain widely varying amounts of the catalytically active materials and interspersants. In the final product, however, it is ordinarily the case that the amount by weight of interspersants is approximately equal to and can range up to 10 times or even more the weight of the catalytically active material, the only limitation being the decreasing activity because of lower amounts of catalytically active material. The relative proportions of the first used interspersants to the second interspersants can also vary widely, particularly since, which will be seen from the foregoing, much of each of them may serve principally as a diluent. Thus they may be almost equal in amounts and may range from a ratio of 1:10 to 10:1.

Catalysts prepared as just described are first dried and heated at temperatures from about 200 to 500° C. as needed to decompose decomposable compounds and to remove water. Following this heating, the pellets or tablets can be formed, though it can be done after such tableting.

Catalysts prepared as above described can be supported in the ways already well understood in the art. They can be applied as slurries to conventional supports and heat-treated as will hereinafter be described.

Suitable supports and carriers are:
(1) Porous ceramic spheres, tablets, or rings which have a softening or melting point in excess of 1200° C.;
(2) Etched nickel, Nichrome, and Inconel wire;
(3) Alundum;
(4) Pumice;
(5) Diaspore;
(6) Bauxite;
(7) Periclase;
(8) Zirconia;
(9) Titania;
(10) Diatomaceous earth;
(11) Calcium sulfate;
(12) Barium oxide;
(13) Calcium oxide;
(14) Activated alumina granules.

Instead of supporting the catalysts as just described it is often preferable to compress them to form tablets or pellets. This can be done with conventional pelleting and tableting machinery. A pelleting lubricant should be used, such as powdered graphite or stearic acid. Other conventional lubricants can be used, and the amounts are those normally employed, say 0.1 to 2%, the exact amount being determined in accordance with customary practice.

The catalyst pellets or the supported catalyst are preferably heat-treated to effect a structural orientation in the aggregate which brings the crystallites closer together and increases the voids between the groups of crystallites. This heat treatment can be omitted.

The temperature to be used should be selected to effect this modification, but should not be so high as to result in sintering of the catalyst components. More specifically, temperatures from about 250–800° C. will be satisfactory. The heating must occur for long enough to effect a desired degree of such orientation, and may vary from a few minutes to several hours. At lower temperatures around 250° C. an hour or so may profitably be used and at around 400° C., which is a preferred temperature, about 30 minutes or somewhat less is adequate. At still higher temperatures, times of only 5 or 10 minutes are sufficient.

The catalysts of the present invention can be used in the same ways as prior art catalysts containing the same active catalytic materials. Thus they can be used for a wide variety of oxidations and reductions and many have especially great value for oxidation or reduction or both of combustion gases such as those resulting from burning gas or other fuels as in household appliances or burning similar fuels in heating devices or internal combustion engines. Specific catalysts and suggested uses will be given in the examples.

A particularly valuable use of catalysts of the invention is in catalytic converters for use of motor vehicles. Thus the chromite catalysts shown can be used in suitable catalytic converters which ideally should muffle sound and should provide, if oxidation is wanted, for an adjustable air supply. Suitable muffler designs are described in the literature.

In order that the invention may be better understood reference should be had to the following illustrative examples.

*Example 1*

(1) 63 parts by weight of copper as copper nitrate is dissolved in 1000 parts by weight of water. 100 parts by weight of chromic acid anhydride is then dissolved in the solution. 25 parts by weight of silica sol is also dispersed in the solution. The silica sol is a commercial product. The silica sol is an ammonia-stabilized sol containing 20% $SiO_2$ and the particle diameter is of the order of 5 millimicrons.

(2) The solution containing the dispersed silica is heated to to 35° C. at which temperature vaporized anhydrous ammonia is added to the solution until precipitation of basic copper chromate is complete.

(3) The resulting slurry is filtered and the filter cake is dried. The dried filter cake is calcined at 400° C. for 2 hours.

(4) The calcined filter cake is kneaded with sufficient water to form a wet paste and with an additional quantity of titanium dioxide in the form of a sol to be equivalent to 20% of the weight of the calcined powder of $TiO_2$. The particle size of $TiO_2$ is of the order of 5 millimicrons or somewhat under—that is 50 angstroms or under. Kneading is continued for 1 hour until the paste is homogeneous.

It is noted that in the catalyst aggregate as thus prepared, the catalyst group is $\gamma$ and of the cubic crystal system. The first interspersant is $\beta$ and is of the hexagonal system. The second interspersant is $\beta$ and tetragonal.

(5) The kneaded paste is dried. The dry product can be used in lump form or can be tableted or pelleted after mixing with 1% of graphite or stearic acid as a lubricant for the tableting or pilling operation.

(6) The catalyst thus prepared is useful for the hydrogenation of organic esters to alcohols under customary conditions of reaction. The catalyst is further very useful for the reduction of nitrogen oxides and for the oxidation of carbon monoxide and hydrocarbon components and other combustibles in automobile exhaust fumes.

*Example 2*

(1) 63 parts by weight of copper as copper sulfate and 130 parts by weight of zinc as zinc sulfate are dissolved in 2000 parts by weight of distilled water. It is noted that throughout the application when water is mentioned the water should be of reasonable purity and especially if the normal tap water supply is high in impurities it will be desirable to use distilled or demineralized water in accordance with conventional practices.

(2) 318 parts by weight of sodium carbonate is dissolved in 2000 parts by weight of water. This solution is added to the one prepared in item 1 above to effect precipitation. The precipitate is washed to remove the sulfate ion and is filtered.

(3) The filter cake is dried and is calcined at 425° C. for two hours.

(4) The calcined filter cake is kneaded with sufficient water to make a paste. There is added to the paste barium hydroxide equal to 25% by weight of the calcined powder. The whole pasty mass is heated for about one hour to make it homogeneous. The barium hydroxide, because of solubility in water will become very finely divided and will find its way into the interstices of the calcined powder. Upon later calcination it converts to barium oxide of very fine crystallite size.

It is noted that in the catalyst aggregate as thus prepared, the catalyst group is $\gamma$ and of the cubic crystal system. The first interspersant is delta and is of the hexagonal system. The second interspersant is $\alpha$ and cubic.

(5) The kneaded paste after drying is calcined at 325° C. for two hours. After calcination the dried mass is crushed and screened to form granules usable as a catalyst. It can instead be pulverized and after addition of a lubricant, pelleted in conventional manner.

(6) The catalyst as thus prepared is useful for conversion of carbon monoxide in the presence of steam to carbon dioxide and hydrogen. It is also useful for cyanation reactions in which the nitrile group is added to organic molecules under conventional reaction conditions.

A catalyst useful for the same purposes is similarly prepared using in Step 4 the same weight of magnesium hydroxide instead of barium hydroxide. This is illustrated in FIGURE 2. The artist's representation in this figure as in FIGURE 1 shows the crystallites kept apart by each other but does not stress the interconnection in three dimensions between the crystallite aggregates which is difficult to show.

*Example 3*

(1) One part by weight of platinum as chloroplatinic acid is dissolved in 10,000 parts by weight of water. 1000 parts by weight of zirconium oxide as a sol is added to the solution.

(2) The platinum is precipitated using hydrogen sulfide as a precipitant. The platinum can also be precipitated with suitable reducing agents such as formaldehyde and other reactive aldehydes and hydrogen, all in conventional manner.

(3) The resulting catalytic aggregate of platinum metal, the crystallites of which are separated by zirconia crystallites, is separated from water, dried at 175° C.

(4) 100 parts by weight of the aggregate prepared as above is kneaded with 10 parts by weight of chromium as chromium nitrate together with sufficient water to dissolve the nitrate and to form a thin paste with the aggregate. Kneading is continued until the mixture is homogeneous.

It is noted that in the catalyst aggregate as thus prepared, the catalyst group is $\gamma$ and is of the cubic crystal system. The first interspersant is $\beta$ and is of the monoclinic system. The second interspersant is $\beta$ and hexagonal.

(5) The wet paste is dried, then calcined at 475° C. for two hours. The product can be used as granules or as pills, or pellets.

(6) The catalyst prepared as above is useful for the oxidation of ammonia to nitric oxide, for the oxidation of sulfur dioxide to sulfur trioxide, the oxidation of organic aldehydes to organic acids and for the hydrogenation of butadiene to butylene, all under conventional reaction conditions. The catalyst can also be used for reduction of nitrogen oxides and, after addition of air, for the oxidation of carbon monoxide, hydrocarbons, and other combustible materials in automobile exhaust fumes.

In the following examples, catalysts are prepared as in Example 3 but replacing the parts of platinum by the indicated parts of the catalytic materials shown below. The catalysts prepared are useful for purposes as shown in Example 3.

| Example No. | Catalytic material | Parts by weight |
| --- | --- | --- |
| 4 | Ruthenium | 50 |
| 5 | Rhodium | 20 |
| 6 | Osmium | 10 |
| 7 | Iridium | 10 |
| 8 | Palladium | 50 |

Example 9

(1) 58 parts of weight of nickel as nickel nitrate and 100 parts by weight of chromic acid anhydride are dissolved in 2000 parts by weight of water. There is also slurried in this solution 75 parts by weight of titanium dioxide as a sol. The sol contains 20% $TiO_2$.

(2) Vaporized anhydrous ammonia is added to the solution, heated to 35° C. to effect complete precipitation of basic nickel chromate. The slurry is filtered and the filter cake dried.

(3) The dried filter cake is calcined at 450° C. for two hours.

(4) 100 parts by weight of the calcined filter cake is kneaded with sufficient distilled water to make a thin paste and there is also added to the paste a silica sol stabilized with ammonia, the amount of $SiO_2$ being equal to 5 parts by weight of the calcined powder.

It is noted that in the catalyst aggregate as thus prepared, the catalyst group is $\gamma$ and of the cubic crystal system. The first interspersant is $\beta$ and is of the tetragonal system. The second interspersant is $\beta$ and hexagonal.

(5) The product thus prepared is dried and formed into pellets, tablets or granules in conventional manner for use as a catalyst.

(6) The catalyst prepared as above can be used for the conversion of carbon monoxide and hydrogen to methane for removal of carbon monoxide from gases such as hydrogen to be used in hydrogenation reactions, and for the selective hydrogenation of acetylene in the presence of ethylene.

The catalyst prepared as above is useful for the oxidation of ammonia to nitric oxide, for the oxidation of sulfur dioxide to sulfur trioxide, the oxidation of organic aldehydes to organic acids, and for the hydrogenation of butadiene to butylene, all under conventional reaction conditions. The catalyst can also be used for reduction of nitrogen oxides and, after addition of air, for the oxidation of carbon monoxide, hydrocarbons, and other combustible materials in automobile exhaust fumes.

Catalysts can be prepared as in Example 9 replacing the nickel nitrate with an atomic equivalent weight of one of the following metals as the nitrate, sulfate, chloride, or another appropriate compound as follows. Catalysts as thus prepared can be used as described in Example 9.

| Example No.: | Metal |
| --- | --- |
| 10 | Cadmium sulfate. |
| 11 | Zinc sulfate. |
| 12 | Mercuric nitrate. |
| 13 | Bismuth nitrate. |
| 14 | Ferrous sulfate. |
| 15 | Cobaltous chloride. |

Example 16

(1) 81 parts by weight of zinc oxide is mixed with 55 parts by weight of manganese as manganese nitrate hexahydrate.

(2) To this mixture is added 50 parts by weight of zirconium silicate as a finely divided powder, the ultimate particles of which are in the colloidal range or are pulverulent to such size.

(3) The mixture is heated to the point of fusion while being stirred and decomposition is effected until decomposition is finished.

(4) The calcined material is mixed with lanthanum nitrate and fusion is repeated until the decomposition of the nitrate is completed.

It is noted that in the catalyst aggregate as thus prepared, the catalyst group is $\gamma$ and of the cubic crystal system. The first interspersant is delta and is of the tetragonal system. The second interspersant is $\alpha$ and hexagonal.

(5) The resulting aggregate is granulated or pulverized and is tableted or pilled in conventional manner.

(6) The catalyst can be used for the oxidation of organic aldehydes to acids or oxidation of alcohol to acids. It can be used for the oxidation of hydrochloric acid to free chlorine and water vapor. It can be used for the decomposition of organic peroxides and hydroperoxides.

The catalyst prepared as above is also useful for the oxidation of ammonia to nitric oxide for the oxidation of sulfur dioxide to sulfur trioxide, the oxidation of organic aldehydes to organic acids and for the hydrogenation of butadiene to butylene, all under conventional reaction conditions. The catalyst can also be used for reduction of nitrogen oxides and, after addition of air, for the oxidation of carbon monoxide, hydrocarbons, and other combustible materials in automobile exhaust fumes. Similarly, a catalyst can be used for oxidation of similar components in the fumes from household appliances such as refrigerators, gas heaters, clothes driers, and the like which burn fuels.

Catalysts useful for the same purposes as the catalysts of Example 16 can be prepared with other manganates, the amount of manganate in each instance being the same as above and being prepared by fusion of the components below tabulated. It is noted that when the term "manganate" is used herein it refers in accordance with customary practice to manganese in the plus four valence state. In some literature references this is also referred to as manganite.

| Example No.: | Manganates |
| --- | --- |
| 17 | Copper nitrate fused with manganese nitrate. |
| 18 | Cadmium oxide fused with manganese nitrate. |
| 19 | Calcium carbonate fused with manganese acetate. |
| 20 | Nickel sulfate fused with manganese nitrate. |
| 21 | Cobalt nitrate fused with manganese hydroxide. |
| 22 | Iron nitrate fused with manganese carbonate. |
| 23 | Stannous oxide fused with manganese nitrate. |
| 24 | Barium carbonate fused with manganese chloride. |

Example 25

(1) 112 parts by weight of cadmium as cadmium nitrate and 143 parts by weight of strontium nitrate are dissolved in 2000 parts by weight of water, 206 parts by weight of sodium molybdate is dissolved in 1000 parts by weight of water. The two solutions are mixed.

(2) The resulting precipitate is filtered after washing to remove the sodium nitrate and the filter cake is kneaded with 25 parts by weight of zinc carbonate as a second interspersant. The resulting paste is dried.

(3) The dry cake is calcined at 350° C. The catalytic aggregate is then formed into pills, pellets, granules, or other suitable form as in the examples above.

It is noted that in the catalytic aggregate the catalyst is $\gamma$ and of the tetragonal crystal system. The first interspersant is $\alpha$ and cubic and the second interspersant is delta and hexagonal.

(4) The catalysts can be used for the oxidation of olefins to unsaturated aldehydes and acids. They can be used for dehydrosulfurization of organic sulfur compounds such as thio ethers and thio alcohols. They can also be used for the dehydrogenation of organic compounds by oxidative dehydrogenation processes. The conditions in all of the above being those customary in the art.

Catalysts which can be used for the purposes described in Example 25 and for other purposes can be prepared employing other molybdates using the same atomic equivalent of the cation. Thus, as tabulated below, the salts shown can replace the nitrate:

Example No: Molybdates
26 _____ Calcium nitrate.
27 _____ Barium chloride.
28 _____ Lead acetate.

*Example 29*

(1) 127 parts by weight of anhydrous ferric chloride is dissolved in 100 parts by weight of water in which is slurried 50 parts by weight of aluminum hydrate. 194 parts by weight of sodium tungstate is dissolved in 2000 parts by weight of water. The two solutions are mixed and the iron tungstate precipitate is filtered and washed to remove sodium chloride.

(2) 40 parts by weight of cadmium carbonate is added to the still wet filter cake and kneaded to make a homogeneous paste.

(3) The cake is dried and calcined at 375° C. for two hours.

The catalyst in the resulting aggregate is $\gamma$ and is in the monoclinic crystal system. The first interspersant is delta and hexagonal. The second interspersant is $\alpha$ and cubic.

(4) The catalysts of this example can be used for the oxidation of alcohols to aldehydes or for simultaneous oxidative dehydrogenation and hydration of hydrocarbons to form alcohols and for simultaneous oxidative dehydrogenation and amination to form monoamines or polyamines from hydrocarbons and ammonia. They can be used for nitrolysation of olefins to unsaturated nitriles.

*Example 30*

(1) 485 parts by weight of bismuth nitrate is dissolved in 2000 parts by weight of water at 90° C. 451 parts by weight of ammonium meta vanadate is dissolved in 5000 parts by weight of water. 100 parts by weight of sodium meta silicate is dissolved in the second solution. The two solutions are mixed and the resulting precipitate is filtered and the sodium salts removed by washing.

(2) The filter cake is dried at 150° C. and then kneaded with 100 parts by weight of titanium dioxide added as a 20% sol. Sufficient additional water is added to make a thin paste. The paste is kneaded to form a homogeneous paste, the time being about one hour.

(3) The resulting paste is dried at 175° C. for 16 hours. It is thereafter pelleted, tableted, or formed into granules or other suitable shapes. The catalyst while still wet can be coated upon a suitable support such as alundum, nichrome, or any of the other supports listed in the specification above in the proportion of about 10% of catalyst as prepared based upon the weight of the carrier. More or less can be used and the catalyst can be thinned to assist application if desired. It is to be noted with respect to each of the examples given above that the catalyst prepared can be supported in similar fashion and in similar amounts.

The catalyst is of the $\gamma$ group and is of the orthorhombic crystal system. The first interspersant is $\beta$ and hexagonal. The second interspersant is $\beta$ and tetragonal.

(4) The catalyst can be used for oxidative dehydrogenation and cyanation. For oxidation of alcohols to aldehydes and oxidation of olefins to unsaturated aldehydes and oxidation of unsaturated aldehydes to unsaturated acids. It can be used for oxidation of sulfur dioxide to sulfur trioxide and for oxidative dehydrogenation and hydration of hydrocarbons and for the oxidation of benzene to phenol.

The catalyst can also be used for reduction of nitrogen oxides and, after addition of air, for the oxidation of carbon monoxide, hydrocarbons, and other combustible materials in automobile exhaust fumes.

*Example 31*

A catalyst is prepared as in Example 30 except that in Step 1 an equal atomic value of chromium as chromium nitrate is substituted for the bismuth anion employed above. The catalyst as thus prepared can be used as described in the above example and, of course, for other purposes as well.

*Example 32*

(1) 153 parts by weight of barium oxide, 436 parts by weight of cerous nitrate $6H_2O$, and 25 parts by weight of beryllium oxide which is either reducible or decomposable in this process to a crystallite size than 50 angstroms are heated to melting and to a temperature at which the nitrate salts are decomposed.

(2) The solidified melt resulting from Step 1 is pulverized and is then intimately mixed with 40 parts by weight of magnesium oxide and sufficient water to form a paste. The wet homogeneous paste is dried for 12 hours at 150° C.

(3) The product thus prepared is crushed and formed into granules, pellets, tablets, or pulverulent powder for use as a catalyst.

The barium cerate catalyst of this example is in the beta classification and monoclinic system. The beryllium oxide, first interspersant, is in the alpha classification and the hexagonal crystal system. Magnesium oxide is in the alpha classification and cubic crystal system.

(4) Catalyst as prepared in this manner can be used as an internal oxidant in fuel cells where it serves to prevent polarization and performs as a co-catalyst. It is also useful for chlorination of hydrocarbons and halogenations in general. It is also effective for the treatment of the exhaust fumes from an automotive engine.

Catalysts which can be used for the purposes of Example 32 and for other purposes can be prepared employing other cerates using the same atomic equivalents of the cation. Thus, as tabulated below, the salts shown can replace the barium oxide.

| Example No. | Catalytic material | Parts by weight |
|---|---|---|
| 33 | Cadmium nitrate | 236 |
| 34 | Calcium formate | 130 |
| 35 | Copper nitrate trihydrate | 241 |

*Example 36*

(1) Mix together 183 parts by weight of zinc acetate, 150 parts by weight of tin oxide, and 250 parts by weight of aluminum hydrate. Heat to the point of decomposition of the acetate and the hydrate which will be temperature of approximately 300° C.

(2) The product of Step 1 is pulverized, then is mixed with 102 parts by weight of Hf $OCl_2$ and again heated to the decomposition point for the Hf $OCl_2$.

Zinc stannate is in the $\gamma$ classification and cubic crystal system. Aluminum oxide, which is the first interspersant, is in the delta classification and the hexagonal crystal system. Hafnium oxide is in the $\beta$ classification and in the cubic system. It will be noted that in this example both the catalyst and the second interspersant are in the cubic system. This is an example in which isomorphous materials are acceptable.

The product of Step 3 is pulverized and used in the pulverulent form or can be crushed and screened and used in the granular form or can be converted to pellets.

(4) Catalysts of this example are useful for the hydration of ethers to alcohols, the oxidation of cyclohexane to cyclohexanol and cyclohexanone, and for the abatement of fumes in automotive engine exhausts.

Catalysts which can be used for the purposes of Example 36 and for other purposes can be prepared employing other stannates using the same atomic equivalents of the cation. Thus, as tabulated below, the salts shown can replace the zinc acetate.

| Example No. | Catalytic material | Parts by weight |
|---|---|---|
| 37 | Cobalt nitrate 6H₂O | 291 |
| 38 | Lead diacetate | 325 |
| 39 | Barium nitrate | 261 |
| 40 | Cadmium formate dihydrate | 238 |
| 41 | Calcium nitrate | 164 |

*Example 42*

(1) 152 parts by weight of chromic oxide and 574 parts by weight of ferric nitrate hexahydrate are mixed together with a separately precipitated quantity of magnesium aluminate equivalent to 25 parts by weight. The magnesium aluminate is prepared by precipitation effected by intermixing stoichiometric solutions of magnesium chloride and sodium aluminate and washing to remove sodium chloride.

(2) Heat the mixture of Step 1 to effect decomposition of the nitrate and the preparation of a homogeneous catalystic mass.

(3) Pulverize the product from Step 2 and mix with 74 parts by weight of calcium hydroxide and sufficient water to make a homogeneous paste.

The chromium ferrate catalyst is in the γ classification and the hexagonal crystal system. The magnesium aluminate is in the delta classification and the cubic crystal system. The calcium oxide is in the α classification and the cubic crystal system. It will be noted that the first and second interspersants of this example are both in the cubic system and this has been found to be acceptable.

(4) The mixture is heated to 200° C. and thereafter the product is granulated for use in the granular form or converted to pulverulent form or into pills or tablets.

(5) Catalysts of this example are useful for carbonylation reactions such as the addition of CO to olefins and alcohols; The nitrolysation of olefins with NO to produce saturated and unsaturated nitriles; and also for the synthesis of ammonia from hydrogen and nitrogen.

Catalysts which can be used for the purposes of Example 42 and for other purposes can be prepared employing other ferrates using the same atomic equivalents of the cation. Thus, as tabulated below, the salts shown can replace the chromic oxide.

| Example No. | Catalytic material | Parts by weight |
|---|---|---|
| 43 | Zinc oxide | 81 |
| 44 | Calcium oxide | 56 |
| 45 | Cadmium oxide | 128 |
| 46 | Copper oxide | 80 |
| 47 | Barium oxide | 153 |
| 48 | Lead oxide | 223 |
| 49 | Manganese oxide | 70 |
| 50 | Iron oxide | 72 |
| 51 | Cobalt oxide | 75 |
| 52 | Nickel oxide | 75 |

*Example 53*

(1) 170 parts by weight of silver nitrate and 184 parts by weight of magnesium nitrate dihydrate are dissolved in 2,000 parts by weight of water.

(2) A 10% sodium carbonate solution is added to the solution prepared in Step 1 to cause complete precipitation and the precipitate is washed to remove the sodium nitrate.

(3) The mixture of silver and magnesium carbonates obtained as a filter cake is dried, heated to 300° C. to effect decomposition of the carbonates.

(4) The dried product is kneaded with sufficient water to form a paste and 25 parts by weight of finely divided zirconium silicate are mixed into the kneaded paste until the paste is again uniform. Sixty minutes will be required.

Silver oxide is in the β classification and the cubic crystal system. Magnesium oxide is in the α classification and the cubic system. Zirconium silicate is in the delta classification and the tetragonal system.

(5) The wet cake is dried, granulated, and the granulated product is useful as a catalyst as such or can be converted to pellets, pills, or to finely divided powder for use in slurry-type catalytic operations.

(6) This catalyst is useful for oxidations such as methanol to formaldehyde and ethylene to ethylene oxide. It is also useful for halogenations of double bonds.

*Example 54*

(1) 150 parts by weight of ammonium chromate is mixed with 200 parts by weight of zirconium oxide in the form of a hydrous gel to form a uniform paste.

(2) The paste so formed is further mixed with titanium in the form of a sol to form a uniform paste having a dough-like consistency.

Chromic oxide is in the α classification and hexagonal crystal system. Zirconium oxide is in the β classification and monoclinic system. Titanium dioxide is in the β classification and the tetragonal system.

(3) The final paste is dried and heated to 300° C. to effect dehydration of the constituents and decomposition of the chromate salt.

(4) The catalyst is useful for halogen substitutions such as F₂ for Cl₂ in halogenated hydrocarbons; it can also be used for the polymerization of olefins; it can also be used for isomerization reactions; it is also effective for the abatement of nitrogen oxides and combustible constituents in automobile exhausts.

Catalysts which can be used for the purposes of Example 54 and for other purposes can be prepared employing other oxides using the same atomic equivalents of the cation. Thus, as tabulated below, the salts shown can replace the chromic oxide.

| Example No. | Catalytic material | Parts by weight |
|---|---|---|
| 55 | MnO₂ | 87 |
| 56 | ReO₂ | 4 |

*Example 57*

(1) 1 part by weight of ruthenium as ruthenium chloride and 100 parts by weight of Cr₂O₃ as chromium nitrate are dissolved in 100 parts by weight of water.

(2) Ammoniacal ammonium sulfide solution is added to the solution prepared in Step 1 to completely precipitate ruthenium and chromium.

(3) The precipitate is washed to remove soluble salts and filtered. The filter cake is mixed with magnesium aluminate equal to 15 parts by weight which has been prepared as in Example 42 above. Mixing is continued until a uniform paste and homogeneous distribution have been obtained.

The ruthenium is in the γ classification and the hexagonal crystal system, the chromic oxide is in the β classification and the hexagonal crystal system, and the magnesium aluminate is in the delta classification and the cubic system.

(4) The kneaded paste is dried at 200° C. and the dried material is converted to particulate form suitable for liquid phase or gas phase catalytic operations.

(5) The catalyst of this example is useful for carbonylations such as the addition of CO to olefins and alcohols to form ketones, aldehydes and acids; and for the synthesis of long, straight chain alcohols from CO and hydrogen; and for the hydrogenation of benzene to cyclohexane and the saturation of double bonds in olefins and substituted olefins. It is useful also for hydrogenations in which sulfur bearing compounds are present. It is also useful for selective hydrogenation of triple bonds to double bonds such as acetylene to ethylene in the presence of hydrogen and ethylene.

The catalyst can also be used for the abatement of nitrogen oxides and combustible materials in automobile engine exhaust.

Catalysts which can be used for the purposes of Example 57 and for other purposes can be prepared employing other metals using the same atomic equivalents of the cation. Thus, as tabulated below, the salts shown can replace the ruthenium chloride.

| Example No. | Catalytic material | Parts by weight |
|---|---|---|
| 58 | Rhodium (as chloride) | 1 |
| 59 | Osmium (as chloride) | 1 |
| 60 | Cobalt (as nitrate) | 30 |
| 61 | Nickel (as nitrate) | 30 |
| 62 | Iron (as nitrate) | 20 |

*Example 63*

(1) Dissolve 80 parts by weight of ammonium molybdate, $(NH_4)_4Mo_6O_{24} \cdot 4H_2O$, in 1600 parts by weight of distilled water. Add also to this solution 50 parts by weight of titania as a colloidal aqueous dispersion having titania unit crystals of about 5 millimicrons in the longest dimension.

(2) Add over a 1-minute period to the solution obtained in Step 1, 25 parts by weight of hydrochloric acid dissolved in 43 parts by weight of distilled water (i.e., 68 parts by weight of a 37% hydrochloric acid solution).

(3) Dissolve 60 parts by weight of ferric chloride, $FeCl_3 \cdot 6H_2O$, in 570 parts by weight of distilled water.

(4) Exactly one minute after performing the operation of Step 2, add the ferric chloride solution of Step 3 to the solution prepared in Step 1.

(5) The resultant slurry is allowed to age for one hour, then is washed to remove the ammonium chloride, then is filtered.

(6) The filter cake of Step 5 is kneaded with 40 parts by weight of silica in the form of an aerosol having crystallites of about 5 millimicrons in the longest dimension.

The catalyst in this example is in the alpha classification and rhombohedral crystal system; the first interspersant is in the alpha classification and tetragonal system whereas the second interspersant is in the alpha classification and hexagonal crystal system.

(7) The filter cake is dried, then converted to granules, pellets, or powder to adapt it to catalytic use.

(8) The catalyst of this example is useful for selective oxidations such as oxidizing alcohols to aldehydes, olefins to unsaturated aldehydes, aldehydes to acids, and for the oxidative conversion of olefins or hydrocarbons together with ammonia to saturated or unsaturated amines or nitriles.

*Example 64*

(1) A heteropoly acid, $$H_9Al(MoO_4)_6 \cdot XH_2O$$

is prepared according to U.S. Patent 2,491,695. During the preparation a titania aquasol was added, the amount being such that the weight of $TiO_2$ was 25% of the weight of $MoO_3$ equivalent in the hetoropoly acid.

(2) The aggregate thus prepared was separated from water, dried and pulverized.

(3) To the pulverized product there was added a silica aerogel the weight being 15% of the weight of the aggregate. The mixture was kneaded with water to form a homogeneous paste.

(4) The paste was dried for 12 hours at 150° C. The dry paste was crushed and screened to form granules.

The heteropoly acid is alpha and of the rhombohedral crystal system. The titanium dioxide is beta and of the tetragonal crystal system. The silicon oxide is beta and hexagonal.

(5) The catalyst thus prepared is useful for selective oxidations such as oxidizing alcohols to aldehydes, olefins to unsaturated aldehydes, aldehydes to acids, and for the oxidative conversion of olefins or hydrocarbons together with ammonia to saturated or unsaturated amines or nitriles.

Other heteropoly acid catalysts useful for the purposes of Example 64 can be prepared using the heteropoly acids tabulated below. The heteropoly acids can be formed in conventional manner as shown for example in U.S. Patents 1,913,404; 1,913,415; and 2,491,695. The procedure of Example 64 can be followed exactly using the weights of titania and silica shown. Other interspersants can be employed as described above in similar amounts.

| Example No.: | Heteropoly Acid |
|---|---|
| 65 | $H_9Cr(MoO_4)_6 \cdot XH_2O$ |
| 66 | $H_9Co(MoO_4)_6 \cdot XH_2O$ |
| 67 | $H_9Mn(MoO_4)_6 \cdot XH_2O$ |
| 68 | $H_9Rh(MoO_4)_6 \cdot XH_2O$ |
| 69 | $TiO_2 \cdot 12MoO_3 \cdot 22H_2O$ |
| 70 | $GeO_2 \cdot 12MoO_3 \cdot 32H_2O$ |
| 71 | $V_2O_5 \cdot 8MoO_4 \cdot 5H_2O$ |
| 72 | $(NH_4)_5H_3[H_2MoS]_4VS_3 \cdot 10H_2O$ |
| 73 | $(NH_4)_4H_6[Ni(MoO_4)_6] \cdot 5H_2O$ |
| 74 | $(NH_4)_4H_6[Cu(MoO_4)_6] \cdot 5H_2O$ |
| 75 | $(NH_4)_4 \cdot H_6[Rh(MoO_4)_6] \cdot 7H_2O$ |
| 76 | $(NH_4)_5H_2[P(V_2O_6)_6] \cdot 21H_2O$ |
| 77 | $H_4[SiMo_{12}O_{40}] \cdot 10H_2O$ |
| 78 | $SiO_2 \cdot 12MoO_3 \cdot 32H_2O$ |
| 79 | $P_2O_5 \cdot 24MoO_3 \cdot 63H_2O$ |
| 80 | $B_2O_3 \cdot 24WO_3 \cdot 63H_2O$ |
| 81 | $I_2O_7 \cdot 12WO_3 \cdot 11H_2O$ |
| 82 | Bismuth phosphomolybdate. |

I claim:

1. In a process for the treatment of automobile exhaust gases the step comprising passing said gases together with air over a catalyst made up of aggregates of crystallites no larger than 1500 angstroms of a catalytic material suitable for catalyzing the oxidation of said gases, the said aggregates having been kept apart by crystallites of similar size of a refractory which melts above 1000° C., the aggregates thus constituted having been heated to 200–500° C. until components which decompose in this range have been decomposed and thereafter having added thereto crystallites of similar size of a refractory which melts above 1000° C. thus to form a catalytic aggregate which is stabilized against crystallite growth at high temperatures.

2. In a process for the treatment of automobile exhaust gases a step comprising passing said gases together with air over a catalyst of aggregates of crystallites no larger than 1500 angstroms of a chromite which is suitable for the oxidation of said gases, the said aggregates having been kept apart by crystallites of similar size of a refractory which melts above 1000° C., the aggregates thus constituted having been heated to 200–500° C.. until components which decompose in this range have been decomposed and thereafter having added thereto crystallites of similar size of a refractory which melts above 1000° C. thus to form a catalytic aggregate which is stabilized against crystallite growth at high temperatures.

References Cited by the Examiner

UNITED STATES PATENTS

| 1,345,323 | 6/1920 | Frazier et al. | 23.2.2 |
| 2,025,140 | 12/1935 | Wenzel | 23—2 |
| 2,031,475 | 2/1936 | Frazier | 23—2 |
| 2,855,370 | 10/1958 | Lundsted | 252—467 |
| 2,910,444 | 10/1959 | Cramer | 252—467 |
| 2,941,958 | 6/1960 | Connor et al. | 252—477 X |
| 3,033,801 | 5/1962 | Kloepfer | 252—477 X |

FOREIGN PATENTS 413,967  7/1934  Great Britain.

MAURICE A. BRINDISI, *Primary Examiner.*